I. S. CORSON.
WEED BURNER.
APPLICATION FILED FEB. 3, 1921.

1,410,659.

Patented Mar. 28, 1922.
2 SHEETS—SHEET 1.

Fig. 1.

Inventor
I. S. Corson

By Geo. P. Kimmel, attorney

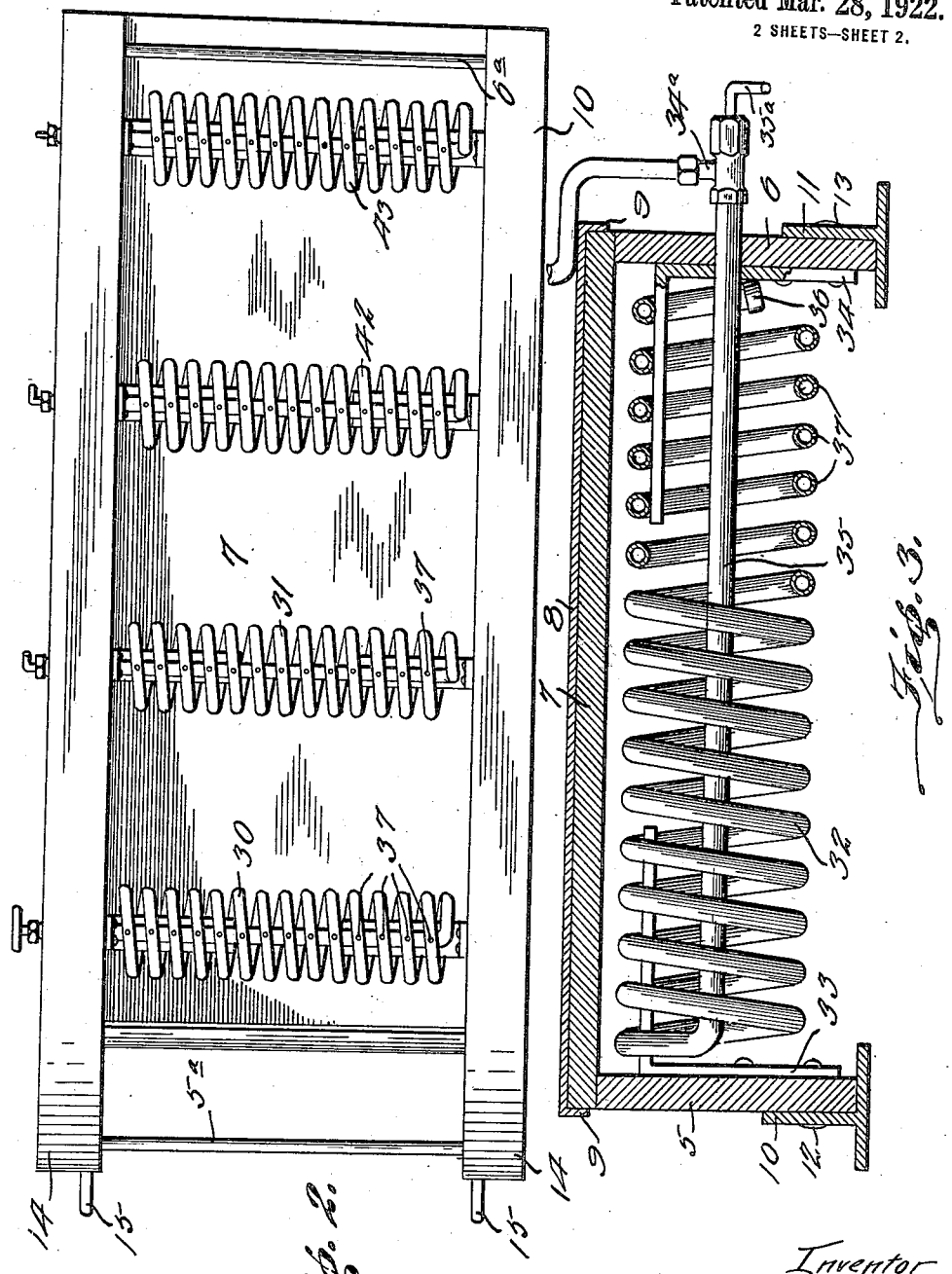

UNITED STATES PATENT OFFICE.

ISAAC S. CORSON, OF GREAT FALLS, MONTANA.

WEED BURNER.

1,410,659. Specification of Letters Patent. Patented Mar. 28, 1922.

Application filed February 3, 1921. Serial No. 442,140.

*To all whom it may concern:*

Be it known that I, ISAAC S. CORSON, a citizen of the United States, residing at Great Falls, in the county of Cascade and State of Montana, have invented certain new and useful Improvements in Weed Burners, of which the following is a specification.

This invention relates to a new and improved device for destroying and exterminating noxious weeds and grass, foul seed, germs and other matter destructive to plant life.

The primary object of the invention is the construction of a simple and improved device which may be readily drawn or dragged over the ground and provided with burners whereby the flames may be projected toward and on the ground so as to destroy such matter lying in its path, and in addition any plant or animal life that may be in the ground.

Another object of the invention is to produce a rigid, comparatively low frame preferably constructed of iron which may be supported on runners and wheels and adapted to be propelled over the ground either by traction or animal power, including provision for directing flames over and to the ground being traversed to destroy such matter that may be deleterious to planting and proper cultivation.

A still further object of the invention is to produce a new and improved device of the class set forth provided with an oil burning apparatus thereon whereby gas may be generated and burned in close proximity to the ground being traversed, so as to direct the flames into the ground thus destroying such noxious matter as weeds, or grasses and also the seed thereof that may be in the ground.

An additional and very important object of the invention will be found in the novel arrangement of the fuel burning apparatus and the distributing means therefor whereby the oil under pressure is generated into gas and evenly distributed through a series of coiled pipes, so that the air pressure forces the flames on and into the ground.

With these objects in view, I have shown a practical, yet preferred embodiment of the invention in the accompanying drawing wherein:—

Figure 1 is a side view of the device.

Fig. 2 is a bottom view thereof.

Fig. 3 is an enlarged transverse section through one of the coils.

Referring to the drawing wherein like numerals represent and designate similar parts, I have shown a supporting body, preferably constructed of metal and consisting of a comparatively, low, frame like body open at its front and rear, having side walls 5, 6, top 7, front and rear brace rods 5ª, 6ª, and a removable cover plate 8 provided with a downwardly curved front guard 9ª. The side flanges 9 of the plate retain the same to the top of the body in the manner clearly disclosed in Fig. 3 of the drawing. The supporting body is preferably provided with T-shaped side runners 10, 11 bolted or otherwise loosely secured as at 12, 13, to the outer sides of the said body whereby the device may be readily dragged or drawn over the ground by a tractor or animal power as is readily understood. If so desired the side runners 10, 11 of the body may be mounted so that they may freely move upwardly and downwardly with respect to the body to conform to the irregularities of the ground being traversed. The front portion of the runners are curved as shown at 14 and have attaching hooks or clevises 15 bolted as at 16 for attachment to the propelling means.

A cylindrical storage tank 17 supported on suitable braces 18 which are bolted at 19 to the top of the body is positioned forwardly thereof, as clearly shown in Fig. 1. The tank 17 which is of the usual construction is provided with a top filling spout 20, pressure gage 21 and needle valve 22, whereby the oil may be forced upwardly through an inner feed pipe 23 to the discharge pipe 24, a cut-off valve 25 being also provided for the obvious purpose. In addition to the body or carrier an extension frame for carrying a fuel tank and a seat for the driver may also be provided for the obvious purpose. The discharge pipe 24 is provided with an enlarged lower connection 26 secured at 27 to the top of the body from which connection short feed pipes 28, 29 having valves 44ª, 44ᵇ respectively, extend to a plurality of generators, now to be described. The generators designated 30, 31 each have coiled pipes 32 supported by L-shaped brackets 33, 34 rigidly or adjustably secured to the inner sides of the body of the device, whereby the burners can be raised or lowered to suit the conditions of the surface of the ground, said coils encircling a central pipe 35 which passes through an aperture in the side wall 6 and is provided at its outer end with a T-connection 34ª and a valve 35ª therefor to regulate the fuel in the short feed pipe above referred to. Each coil is also provided with a closure cap 36 and with apertures 37 in the bottom whereby the oil may be ignited and the gas generated as is well understood.

Another pipe 38 is also arranged for conducting fuel to a second connection 39 secured to the top of the body and rearwardly thereof, similar feed pipes 40, 41 being secured to the connection for burning fuel in generators 42, 43 supported in the body and in close proximity to the ground whereby the flames may be directed to such matter as may lie within the path of the device. The cut off valves 44, 45 are also provided for the short feed pipes 40, 41 above referred to which are constructed and arranged in the same manner as above described and as readily apparent upon inspection of Figs. 2 and 3 of the drawing.

From the above construction, it will be readily apparent that I have provided a novel and very useful and improved oil burning apparatus which may be easily and conveniently drawn over a field to destroy such vegetable and animal matter as may come within its path and thus prepare the field for planting or cultivation as is well understood. The fuel in the reservoir or container is readily conducted to the generators whereupon the oil is ignited, suitable and independent control valves being arranged in position for the proper distribution of the fuel for the generators, so that the proper ignition and length of flame desired may be obtained. Due to the low construction of the body or supporting means, it will be readily apparent that as the generators become heated, the heat is confined between the sides and also destroys such insects as are not otherwise burned by the flames.

In the accompanying drawings, I have illustrated my invention embodied in one form by way of example, and which in practice has been found to be highly satisfactory in obtaining the desired results. It will be obvious however that other embodiments may be adopted, and that various changes in the details of construction may be resorted to by those skilled in the art without departing from the spirit and scope of the invention. It is furthermore understood that the invention is not necessarily limited or restricted to the precise elements shown except in so far as such limitations are specified in the subject matter being claimed.

Having shown and described my invention, what I now claim as new and desire to secure by Letters Patent of the U. S. is:—

In a device of the class described comprising an elongated supporting body having parallel sides, and a connecting top, said body being open at its front and rear, ground supporting runners secured to the outer sides of said body, brackets and gas generating coils carried thereby supported by the sides of the body, a tank carried on the top of said body and at the front portion thereof for supplying liquid fuel to said generators, a cut off valve for said tank, independent valves for controlling the supply of fuel to said generators, and a downwardly extending guard at the front of said body.

In testimony whereof, I affix my signature hereto.

ISAAC S. CORSON.